US012526582B2

(12) United States Patent
Moretti et al.

(10) Patent No.: US 12,526,582 B2
(45) Date of Patent: Jan. 13, 2026

(54) AUDIO-TACTILE TRANSDUCER DEVICE BASED ON DIELECTRIC ELECTRO-ACTIVE ELASTOMERS

(71) Applicant: mateligent GmbH, Saarbrücken (DE)

(72) Inventors: Giacomo Moretti, Saarbrücken (DE); Sebastian Gratz-Kelly, Saarbrücken (DE); Marco Fontana, Leghorn (IT); Paul Motzki, Saarbrücken (DE); Gianluca Rizzello, Saarbrücken (DE); Stefan Seelecke, Saarbrücken (DE)

(73) Assignee: Mateligent GmbH, Saarbrücken (DE)

( * ) Notice: Subject to any disclaimer, the term of this patent is extended or adjusted under 35 U.S.C. 154(b) by 273 days.

(21) Appl. No.: 18/108,218

(22) Filed: Feb. 10, 2023

(65) Prior Publication Data

US 2023/0262396 A1 Aug. 17, 2023

(30) Foreign Application Priority Data

Feb. 11, 2022 (EP) .................................... 22156397

(51) Int. Cl.

*H04R 9/18* (2006.01)
*H04R 7/10* (2006.01)
*H04R 9/06* (2006.01)

(52) U.S. Cl.

CPC ................. *H04R 9/18* (2013.01); *H04R 7/10* (2013.01); *H04R 9/066* (2013.01); *H04R 2400/03* (2013.01)

(58) Field of Classification Search

CPC .............. H04R 2400/03; H04R 17/005; H04R 2307/025; H04R 9/066; H04R 19/013; H04R 7/125; H04R 7/10

See application file for complete search history.

(56) References Cited

U.S. PATENT DOCUMENTS

| | | | | |
|---|---|---|---|---|
| 6,376,971 | B1 * | 4/2002 | Pelrine | H04R 5/02 977/788 |
| 2011/0211725 | A1 | 9/2011 | Takewa | |
| 2012/0206248 | A1 * | 8/2012 | Biggs | H10N 30/063 156/70 |

OTHER PUBLICATIONS

Sugimoto Takehiro et al., "A lightweight push-pull acoustic transducer composed of a pair of dielectric elastomer films," The Journal of the Acoustical Society of America, Nov. 1, 2013, pp. EL432-EL437, XP055944319. (Year: 2013).*

(Continued)

*Primary Examiner* — Sunita Joshi
(74) *Attorney, Agent, or Firm* — Blueshift IP; Robert Plotkin

(57) ABSTRACT

The present invention relates to a transducer device comprising:

At least one dielectric electro-active membrane, an actuation element coupled with the at least one electro-active membrane so that the electro-active membrane is biased in at least one of its plane directions;

wherein the actuation element is provided with a mass so that when electrically excited a first resonance frequency is developed in a fundamental mode of a longitudinal oscillation of the actuation element and a second resonance frequency is developed in a fundamental mode of a transverse oscillation of the membrane, wherein the second resonance frequency is at least six times higher than the first resonance frequency.

9 Claims, 8 Drawing Sheets

(56) References Cited

OTHER PUBLICATIONS

Giacomo Moretti et al, "High-frequency voltage-driven vibrations in dielectric elastomer membranes," Mechanical Systems and Signal Processing, Elsevier, Amsterdam, NL, vol. 168, Dec. 13, 2021, 28 pages, XP086926781, ISSN: 0888-3270, DOI: 10.1016/J.YMSSP.2021.108677 (Year: 2021).*

Sugimoto Takehiro et al., "A lightweight push-pull acoustic transducer composed of a pair of dielectric elastomer films," The Journal of the Acoustical Society of America, Nov. 1, 2013, pp. EL432-EL437, XP055944319.

Giacomo Moretti et al, "High-frequency voltage-driven vibrations in dielectric elastomer membranes," Mechanical Systems and Signal Processing, Elsevier, Amsterdam, NL, vol. 168, Dec. 13, 2021, 28 pages, XP086926781, ISSN: 0888-3270, DOI: 10.1016/J.YMSSP.2021.108677.

European Search Report mailed Oct. 18, 2022, in European patent application No. 22156397.6, 18 pages.

Ron Pelrine et al., "High-Speed Electrically Actuated Elastomers with Strain Greater Than 100%," Science, Feb. 4, 2000, vol. 287, Issue 5454, pp. 836-839, DOI: 10.1126/science.287.5454.836.

M. Hodgins et al., "Experimental comparison of bias elements for out-of-plane DEAP actuator system", Smart Materials and Structures, 22 (2013), 10 pages.

Heydt et al. "Acoustical performance of an electrostrictive polymer film loudspeaker", Journal of the Acoustical Society of America 107 (2000), 8 pages.

* cited by examiner

AUDIO-TACTILE TRANSDUCER DEVICE BASED ON DIELECTRIC ELECTRO-ACTIVE ELASTOMERS

TECHNICAL FIELD

The present invention is related to transducer devices based on dielectric electro-active elastomers which can be operated as actuators and/or sensors and which may provide tactile/vibrotactile and/or acoustic feedbacks.

TECHNICAL BACKGROUND

Sensors and actuators are applied in a variety of different technical applications for use as human-machine interfaces and make use of different physical effects. One group of transducers which may be operated as sensors and actuators apply dielectric electro-active elastomers to provide audio-tactile transducer devices.

The audio-tactile transducer devices usually make use of a heterogeneous combination of elements such as dynamic or electrostatic speakers or vibrational disk motors to generate acoustic and tactile feedback.

Transducers including dielectric electro-active elastomers may comprise a membrane or diaphragm of a deformable dielectric elastomer. The dielectric elastomer is sandwiched between two deformable conductive layers forming electrodes. Such a transducer can be operated as actuator or sensor. In actuator operation the transducer acts as an actuator. Therefore, a voltage is applied onto the electrodes. The voltage generates an electrostatic attracting force between the electrodes which applies a pressure onto the sandwiched dielectric elastomer. As a result, the membrane thins and is prolonged and/or relaxed tangentially to its own surface depending on the voltage applied. In sensor operation, external pressure imposed onto the dielectric elastomer leads to a change of its electrical capacity. This capacity change can be measured so that the transducer device can be used as a sensor.

Devices based on dielectric elastomers therefore may form transducers which can be operated as well as a sensor or as an actuator.

For instance, document "High-speed electrically actuated elastomers with strain greater than 100%". Science, 287 (2000) discloses the use of dielectric elastomeric films as electrostatic actuators.

Document M. Hodgins et al., "Experimental comparison of bias elements for out-of-plane DEAP actuator system", Smart Materials and Structures, 22 (2013) suggests the use of dielectric electroactive polymers for actuators, such as pumps and valves.

Document Heydt et al. "Acoustical performance of an electrostrictive polymer film loudspeaker", Journal of the Acoustical Society of America 107 (2000) discloses the use of dielectric electroactive polymers as acoustic actuators (loudspeakers).

Furthermore, from document T. Sugimoto et al., "A lightweight push-pull acoustic transducer composed of a pair of dielectric elastomer films", JASA Express Letters, 16 Oct. 2013, Journal of Acoustical Society of America it is known a push-pull acoustic transducer using dielectric elastomer films. The transducer structure consists of two dielectric elastomer films developed to serve as an electroactive polymer. The transducer utilizes the change in the surface area of the dielectric elastomer film, induced by an electric-field-induced change in the thickness, for sound generation.

It is an object of the present invention to provide a transducer device based on dielectric elastomers capable of concurrently providing tactile and acoustic feedbacks.

SUMMARY OF THE INVENTION

According to the present invention, a transducer device based on dielectric elastomer according to claim 1 as well as a method for operating the transducer device according to the further independent claim is provided.

Further embodiments are indicated in the depending subclaims.

According to a first aspect, a transducer device comprising:

At least one dielectric electro-active membrane, and an actuation element coupled with the electro-active membrane so that the electro-active membrane is biased in at least one of its plane directions;

wherein the actuation element is provided with a mass so that when electrically excited a first resonance frequency is developed in a fundamental mode of a longitudinal oscillation of the actuation element and a second resonance frequency is developed in a fundamental mode of a transverse oscillation of the membrane.

Particularly, the second resonance frequency is at least six times higher than the first resonance frequency and/or the mass of the actuation element may be at least 8 times higher than the mass of the electro-active membrane.

For example, the first resonance frequency may be in a range of 100-500 Hz, preferably in a range of 100-200 Hz, while the second resonance frequency may be in a range of between 0.8-1.8 kHz, preferably in a range of 1 kHz-1.5 kHz.

Above transducer device is based on a membrane or diaphragm e.g. comprising a dielectric electro-active elastomer sandwiched between electrode layers. Such a transducer device can generally be operated as actuator and/or sensor concurrently and independently. So, the transducer device is able to measure or detect displacements, particularly of the actuation element, which result in a deformation of the membrane. Also, the membrane allows to simultaneously effect tactile vibration and acoustic output when operated with a multichromatic or multi-harmonic waveform actuation voltage. Therefore, the electroactive membrane allows to provide a tactile/vibrotactile and/or acoustic output using a same configuration. The separation between the longitudinal oscillation of the actuation element or of the membrane acting on the actuation element, and the transverse structural oscillation of the membrane depending on the excitation frequency of the applied actuation voltage allows to selectively control the kind of feedback or vibration output.

Longitudinal oscillation is an oscillation in which the vibration of the medium is parallel ("along") to the direction the waves travel and displacement of the medium is in the same (or opposite) direction of the wave propagation. A transverse oscillation is an oscillation which is perpendicular to the direction of the oscillation wave's advance.

It may be provided that the electro-active membrane is coupled to the actuating element so that the longitudinal oscillation of the electro-active membrane effects a movement oscillation of the actuating element, particularly vibrotactile feedback of the actuating element. It may be provided that the electro-active membrane is supported by a support element, e.g. a support frame, so that the longitudinal oscillation develops between the support element and the actuation element.

Conventionally, dielectric electroactive elastomer membranes are made of a deformable dielectric layer, e.g. made with silicone or rubber. The opposing plane surfaces of the dielectric layer are covered by an electrode layer, e.g. made of a screen-printed carbon-loaded silicon electrode. So the dielectric layer is sandwiched by the electrode layers.

The electroactive membrane is supported on opposite ends and mechanically coupled with an actuating element. This allows the electroactive membrane to apply forces onto the actuating element, e.g. by the longitudinal oscillation, and to oscillate in structural vibrations for acoustic output. The actuating element is supported to move freely in at least one direction effected by a longitudinal deformation of the electroactive membrane. Therefore, the electroactive membrane concurrently allows obtaining a linear actuation or longitudinal deformation/force through the actuating element and a sound generation by means of structural oscillations of the electroactive membrane.

Preferably, the electro-active membrane may be biased under pre-tension by means of a biasing member, particularly a spring or a biased elastic element particularly between the support element and the actuation element. Alternatively or additionally, the electro-active membrane may be biased by means of a further electro-active membrane.

When a voltage difference is applied on the electrodes of the electroactive membrane due to the resulting electrostatic forces, the electro-active membrane is deformed, which causes the actuation element to displace or to apply a force against a load and/or the electro-active membrane to deform in structural modes. Particularly, a movement of the actuating element is achieved by applying an actuation voltage with a frequency low enough to allow the mass of the actuating element to follow the deformation of the electro-active membrane. This deformation occurs mainly in the directions tangential to the membrane surface. With higher frequencies of the actuation voltage, due to the low-pass filter behavior of the coupling between the electro-active membrane and the actuating element, the mass of the actuating element is not able to follow the quick excitation of the actuated membrane. This results in the electro-active membrane deforming itself under the high frequency excitation of the actuation voltage and developing structural modes. The structural modes of the membrane allow the development of acoustic waves as sound output.

Basically, the way the dielectric electroactive elastomer membrane deforms depends on the frequency of the actuation voltage as a result of the generation of structural vibration modes.

As an example application, mechanical buttons which use such a transducer device operated as a sensor can provide further multimodality with respect to the simultaneous output of kinesthetic force, tactile feedback, and aural feedback, resulting in a touch experience for users. Here, the human-induced displacement of the actuating element can be sensed by monitoring a capacitance of the electro-active membrane and the output can be caused by applying the actuating voltage onto the electro-active membrane accordingly.

By controlling the transducer device with the actuation voltage having both a low frequency component to effect a vibrotactile stimulus and a high-frequency component to have acoustic feedback at the same time, two different kinds of feedback can be provided by the single transducer device.

When the transducer device is used as an interface device in form of a push-button device, activation of the interface device can be detected by sensing a capacitance change of the transducer device. When pushing the button is detected by e.g. a control unit, i.e. by displacing the actuation element, vibrotactile feedback can be output by applying a low-frequency actuation voltage, and acoustic output can be generated by applying a higher frequency actuation voltage at the same time.

It may be provided that the at least one dielectric electro-active membrane has a rectangular, circular, or elliptic shape.

Furthermore, the actuation element may be arranged at one end or in a center region of at least one dielectric electro-active membrane.

Moreover, the at least one of the electrode layers may be partitioned to selectively detect deformation and to selectively apply electrical excitation.

Moreover, a control unit may be configured to selectively apply a multichromatic or multi-harmonic waveform actuation voltage with one or more frequencies onto the electro-active membrane to cause a longitudinal and/or transverse vibration depending on the applied frequencies.

It may be provided that the control unit is further configured to detect an actuation on the actuating element by means of a measurement of a current or a change of electrical capacitance and to selectively apply an AC actuation voltage with one or more predefined frequencies and/or one or more frequency sequences and/or respective predefined amplitudes onto the electro-active membrane depending on the measure of the detected change of the capacitance to cause vibrotactile feedback with the one or more predefined frequencies and/or the one or more frequency sequences and the respective predefined amplitudes and/or acoustic feedback with the one or more predefined frequencies and the respective predefined amplitudes.

BRIEF DESCRIPTION OF THE DRAWINGS

Embodiments are described in more detail in conjunction with the accompanying drawings, in which.

DESCRIPTION OF EMBODIMENTS

Figure 1A:
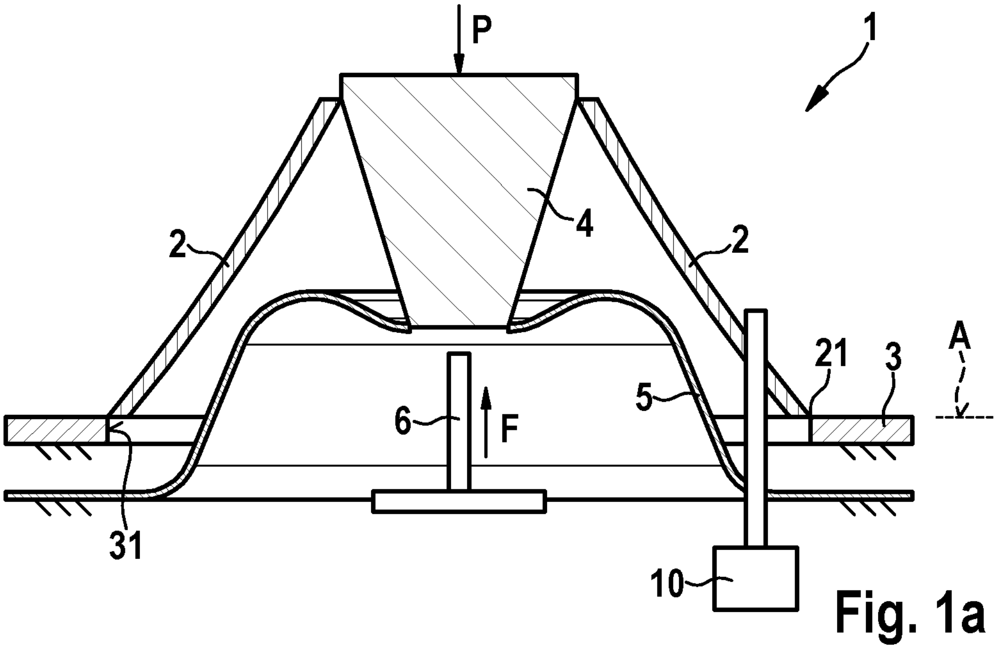
FIGS. 1*a* and 1*b* show a cross-sectional view through a transducer device and a top view of the transducer device according to one embodiment of the present invention, respectively.
Figure 1B:
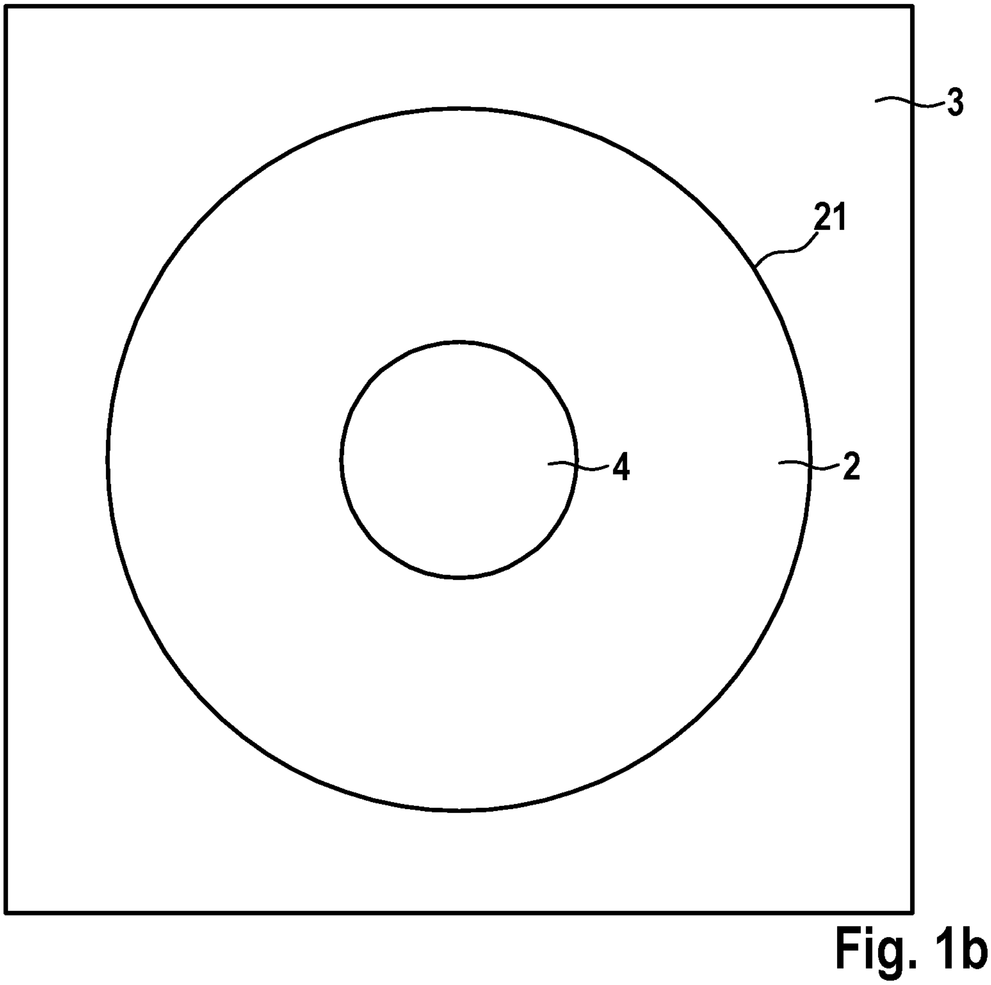

FIGS. 1*a* and 1*b* show a cross-sectional view and a top view of a transducer device 1. The transducer device 1 may have a support frame 3 with a circular opening 31 or recession on which a dielectric electro-active elastomer membrane 2 (also called diaphragm) with a circular shape may be attached. The electro-active membrane 2 may e.g. have a thickness of 0.01 to 1 mm. Particularly, a surrounding edge 21 of the electro-active membrane 2 is at least partly attached on the inner edges of the opening 31 of the support frame 3, preferably in a pre-stretched manner.

Furthermore, an actuating element 4 is attached in an inner region of the electro-active membrane 2. The actuating element 4 is rigid and free to move at least in a direction perpendicular to the support frame 3. Basically, the actuating element 4 is only held by the electro-active membrane 2. Between the support frame 3 and the actuating element 4, a biasing member 5 formed by an elastic spring element such as a plate-shaped member may be provided which applies a bias force F onto the actuating element 4 thereby applying a bias force onto the membrane and lifting the electro-active membrane 2 from the plane A of the support frame 3. The electro-active membrane 2 thereby forms a cone-shaped structure.

Therefore, as shown in FIGS. 1*a* and 1*b* where the electro-active membrane 2 has a circular shape, a cone-shaped structure is formed by the actuating element 4 and the membrane 2. The biasing member 5 may be configured to apply the bias force F with a measure so that each possible external force P onto the actuating element 4 opposite to the bias force F reduces the bias of the membrane 2 while still maintaining electro-active membrane 2 in a stretched condition. Preferably, a stop element 6 may be provided which stops a displacement of the actuating element 4 due to the actuating force P against the effect of the biasing member 5.

The actuation element 4 may be provided with a mass so that when electrically excited a first resonance frequency in a fundamental mode of a longitudinal oscillation of the actuation element and a second resonance frequency in a fundamental mode of a transverse oscillation of the membrane 2 is developed, wherein the second resonance frequency is at least six times higher than the first resonance frequency. For example, the first resonance frequency may be in a range of 100-500 Hz, preferably in a range of 100-200 Hz, while the second resonance frequency may be in a range of between 0.8-1.8 kHz, preferably in a range of 1 kHz-1.5 kHz. Resonance frequencies of the different fundamental modes generally depend on materials, elasticity, dimensions, shape, and mass of the membrane 2, mass of the actuation element 4, and properties of the biasing member 5.

Particularly, the mass of the actuation element 4 may e.g. be at least 8 times higher than the mass of the electro-active membrane.

Figure 2:
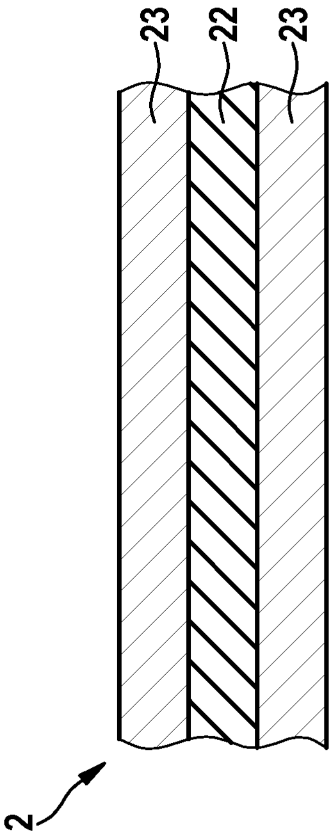
FIG. 2 shows a cross-sectional view of the dielectric electroactive elastomer membrane.

As shown in the cross-sectional view of FIG. 2, the dielectric electroactive elastomer membrane 2 is formed by a dielectric layer 22 made of a flexible polymer, such as an elastomer, e.g. rubber or silicone. The dielectric layer 22 is sandwiched between electrode layers 23 formed by carbon-loaded (or any other conductive particle loaded) silicone electrodes which are basically conductive.

By applying an actuation voltage between the electrode layers 23, the dielectric material of the dielectric layer 22 is deformed by a resulting electrostatic force between the electrode layers 23 so that due to its flexibility thickness is reduced and dimensions of the electro-active membrane 2 in tangential plane directions (perpendicular to the thickness direction) are extended. On the other hand, by removing the actuation voltage or by applying the same polarity of charge onto the electrode layers 23, electrode layers 23 are pushed apart from each other, thereby causing membrane 2 to shrink in its plane directions.

The transducer device may be implemented as a fully polymeric component without rigid parts wherein the support frame 3 holds the membrane 2, then the biasing member 5 and the actuation element 4 are entirely made of polymeric material.

A control unit 10 acting as a logic unit and a power supply unit, may be provided which is electrically connected to the electrode layers 23 is capable to measure the capacitance of the electro-active membrane 2 so that depending on the pressure applied onto the actuating element 4, a varying capacitance can be detected.

The transducer device 1 can be operated by the control unit 10. Control unit 10 allows operating the transducer device 1 as a sensor e.g. by measuring the electric capacitance of the membrane 2 and/or as an actuator by applying an actuation voltage onto the electro-active membrane 2. This allows applying the transducer device 1 in a broad variety of applications using it as an interface device for user interaction, as a position sensor for detecting a position or presence of an object, or to effect an actuation by moving an object.

Other ways of implementing deformation sensing when operated as a sensor might include:

Using simple current measurements (instead of capacitance sensing) to detect a touch. This can be done by applying a constant bias voltage on the membrane, measuring the current, and detecting touches/sudden deformations via peaks in the current drained/absorbed by the transducer device 1.

Providing the electroactive membrane 2 with an additional layer (still made of the same or a different dielectric elastomer) used for sensing only. This way, the additional layer is used to measure capacitance variations, whereas the electrode layers 23 are used for general actuation as described (linear and sound generation).

Due to its pre-stretched condition, the electro-active membrane 2 can be used to apply tactile and acoustic feedback. When the actuation voltage has an overlay of an AC voltage, a frequency behavior can be observed as shown in FIG. 3.

Figure 3:
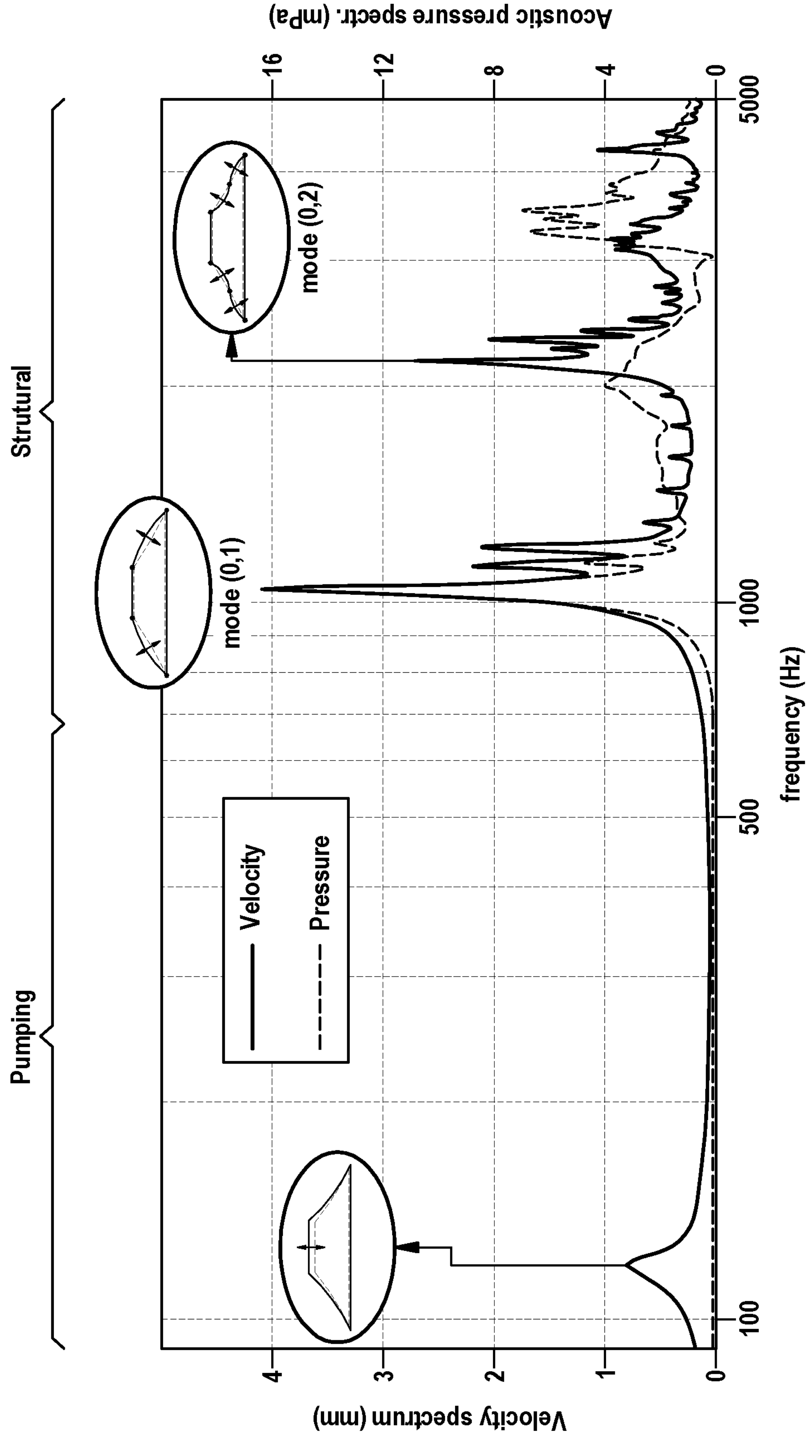
FIG. 3 shows characteristics of the spectrum of the average velocity of the membrane surface and the spectrum of the acoustic pressure applied by the membrane surface over the frequency of the actuation voltage.

FIG. 3 shows a diagram showing the velocity spectrum of the velocity of the actuating element 4 and the acoustic pressure of sound generated by the transducer device 1 depending on the frequency of the actuation voltage. It can be seen that in a lower frequency range of up to 800 Hz, no structural mode of the electro-active membrane 2 occurs but only a pumping mode where the deformation of the electro-active membrane 2 leads to a displacement of the actuation element 4. Furthermore, it can be observed that in a higher frequency range of frequencies of more than 800 Hz, mainly structural mode occurs while the pumping mode diminishes due to the mass of the actuation element 4.

Figure 4:
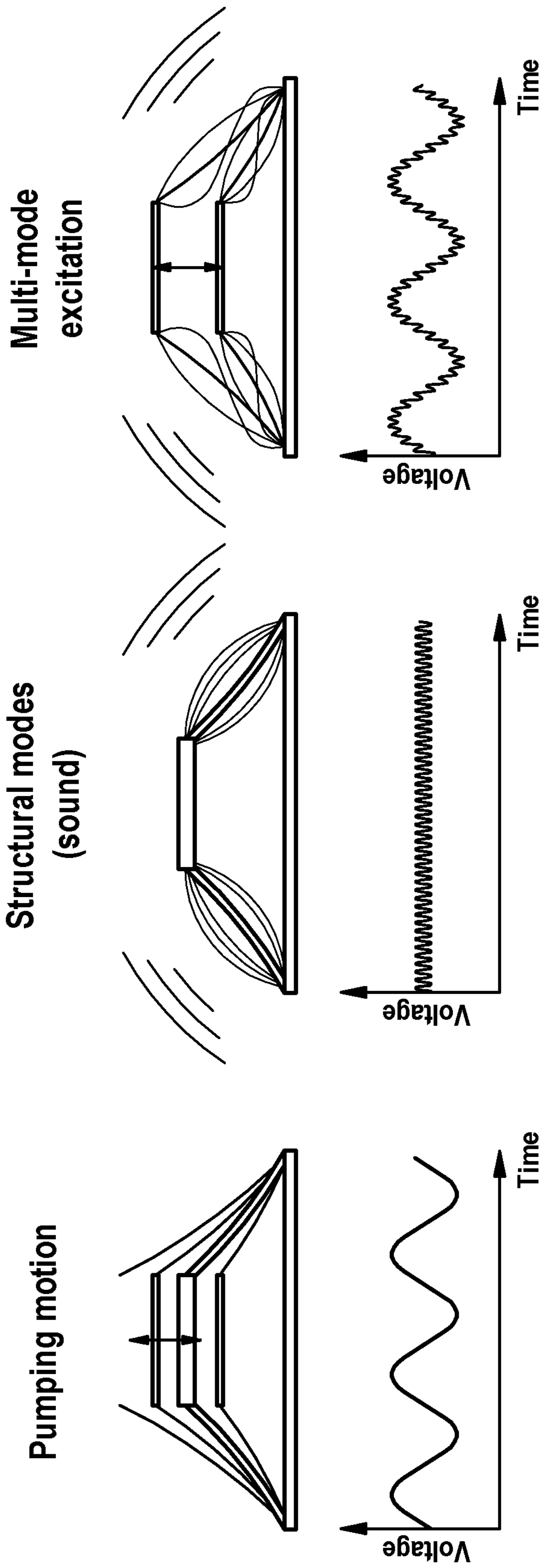
FIG. 4 shows an illustration of the effect of the occurrence of the mode of a longitudinal oscillation and structural modes of a transverse oscillation.

As illustrated in FIG. 4, the structural mode corresponds to oscillation modes of the electro-active membrane 2 itself, which causes the electro-active membrane 2 to bend according to the actuation frequency. For instance, some structural modes are indicated by the amplitude distribution of the electro-active membrane 2 along the plane of the electro-active membrane 2.

The structural modes occurring at higher frequencies are capable to transmit oscillations from the electro-active membrane 2 to the environmental atmosphere, thereby producing acoustic output.

The control unit 10 is therefore capable of controlling the tactile and acoustic output by applying a multichromatic or multi-harmonic waveform component of the actuation voltage. Frequencies in the lower frequency range may cause tactile or vibrotactile feedback to the actuation element 4, while actuation frequencies in the higher frequency range produce sound output, the frequency of which follows the actuation frequency.

The control unit 10, therefore, may be configured to operate the transducer device 1 as an interface device for human interaction such that when the actuation element 4 is operated by a user, e.g. by pressing onto the actuation element 4 with a finger of the user, a vibrotactile and/or acoustic feedback can be generated controlled by the control unit 10. Here, control unit 10 is configured to monitor the electric capacitance of membrane 2 or the current produced/absorbed by membrane 2. Once a change of the capacitance or a peak in the produced/absorbed current is detected, it is determined that actuation element 4 has been pushed. Followingly, the feedback can be generated depending on the detection of the actuation element 4.

Furthermore, it may be provided that the feedback is adapted depending on the measure of pressing force onto the actuation element 4 or of displacement of the actuation element 4. So, when pressing the button lightly with little force, only acoustic feedback is output, while when pressing the button more intensely, alternatively, or in addition, a vibrotactile output is generated or vice versa. Moreover, the frequency of the vibrotactile and/or acoustic actuation feedback can be selected depending on the measure of the detected actuation (pressing) force or the displacement.

In a different embodiment, object detection can be performed by detecting an interaction of the actuation element 4 with an object in proximity. The object can be detected by detecting a change of the capacitance of the membrane 2 when the object displaces the actuation element 4 wherein the control unit 10 may be configured to output acoustic feedback once contact with the object to be detected has been made.

Figure 5A:
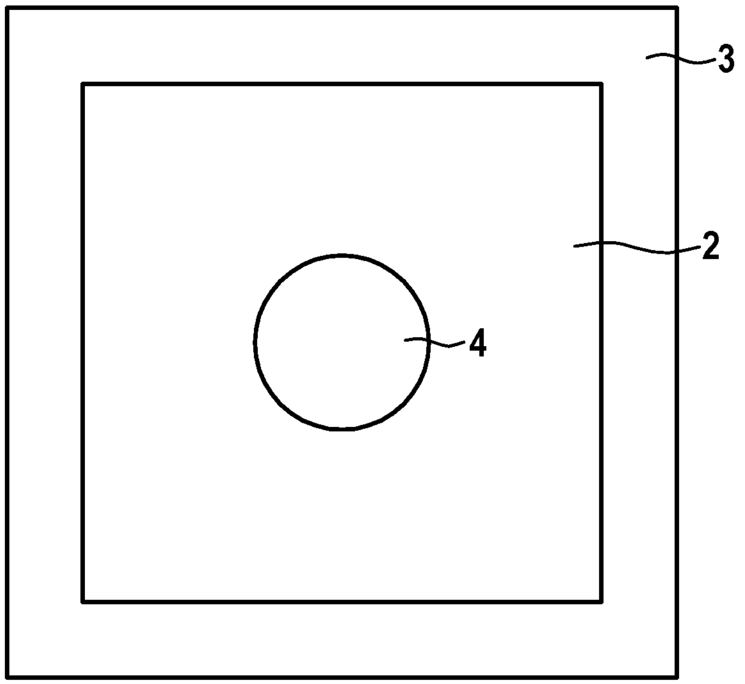
FIGS. 5*a* and 5*b* show different shapes of the electro-active membrane.
Figure 5B:
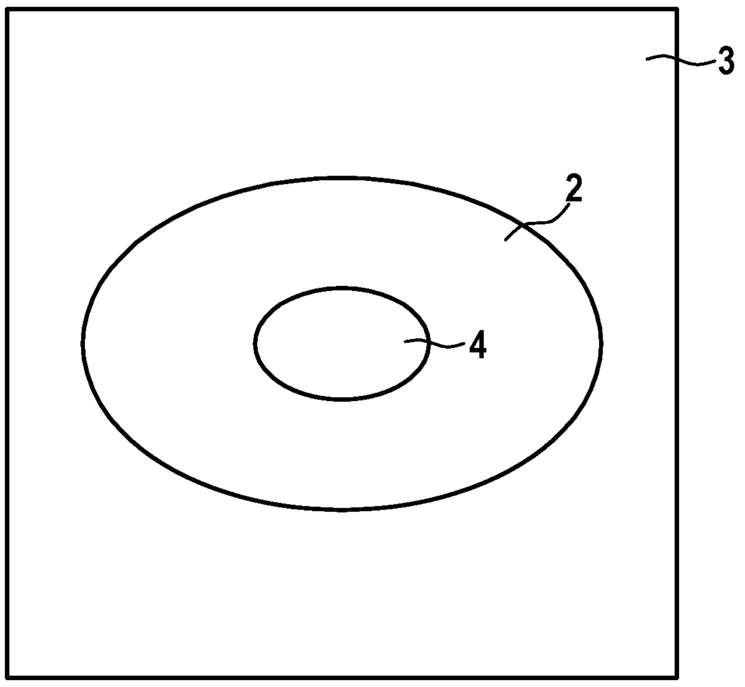

As illustratively shown in FIGS. 5*a* and 5*b*, the electro-active membrane 2 can have different shapes, such as circular as described above, rectangular, elliptical, or the like.

Figure 6C:
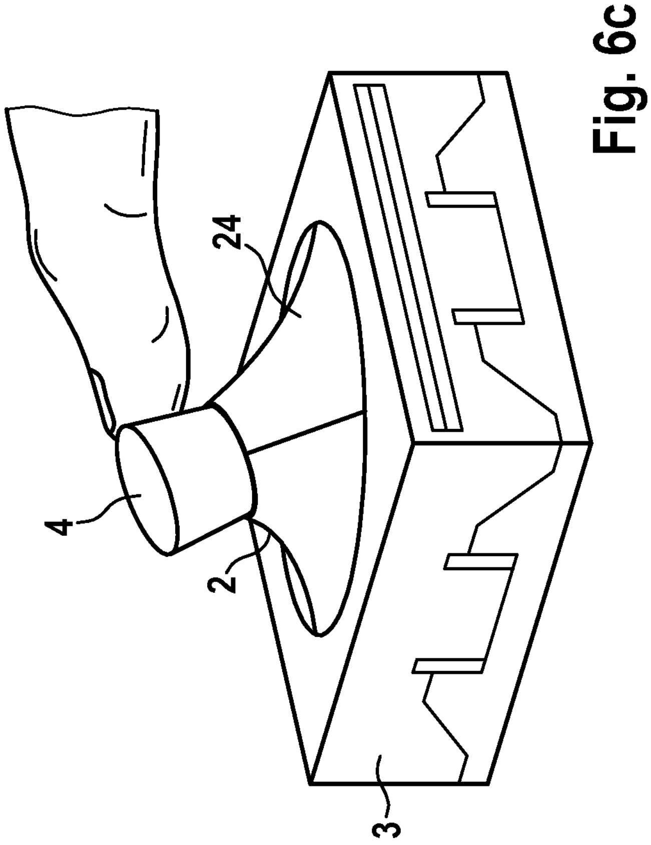
FIGS. 6*a*-6*c* show a top view, a side view, and an application view of a device having partitioned electrodes.
Figure 6A:
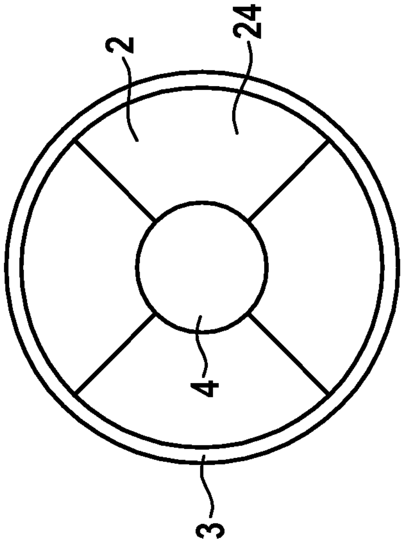
Figure 6B:
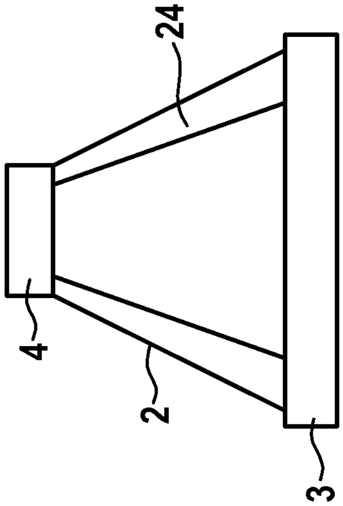

Furthermore, as shown in the embodiment of FIG. 6*a* (top view), FIG. 6*b* (side view), and FIG. 6*c* (application view), the electrode layers 23 of the electro-active membrane 2 can be partitioned so that parts 24 of the electro-active membrane 2 can be sensed and actuated separately by the control unit 10. Therefore, at least one of the electrode layers 23 has parts which are electrically isolated from each other so that they can be controlled by the control unit 10 separately. This may allow detecting a 3D deformation, where not only a displacement of the actuation element 4 towards the support frame 3 can be detected but also a lateral displacement of the actuation element 4. The feedback output, e.g. the vibrotactile and/or acoustic output, can be made depending on the direction of displacement of the actuation element 4.

Figure 7B:
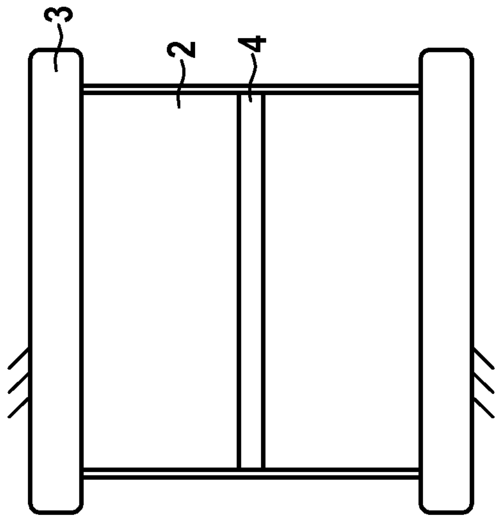
FIGS. 7*a*-7*b* show a cross-sectional view and a side view of a transducer device having an antagonistic membrane arrangement.
Figure 7A:
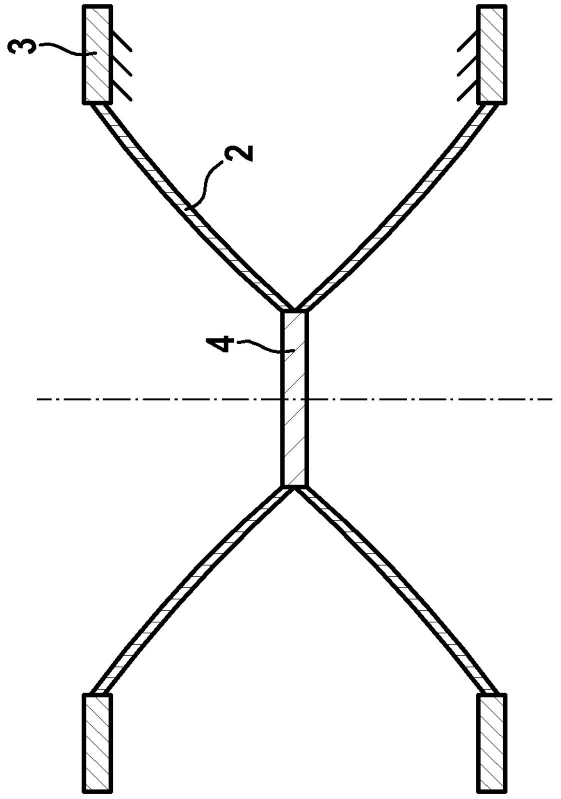

In a further configuration, which is shown in FIGS. 7*a* and 7*b*, the transducer device 1 may have the actuation element 4 coupled with a plurality of membranes. The membranes are arranged in an at least partly antagonistic arrangement. By coupling individual membranes with different positions at the actuation element 4 also a tilting of the actuation element 4 can be detected. By means of the control unit 10 therefore a reaction regarding a desired kind of feedback output (in terms of vibrotactile and/or acoustic and frequency) depending on the level of tilting and/or displacement of the actuation element 4 can be initiated. Such a configuration does not require any biasing member 5 as the plurality of electro-active membranes 2 bias each other.

Figure 8B:
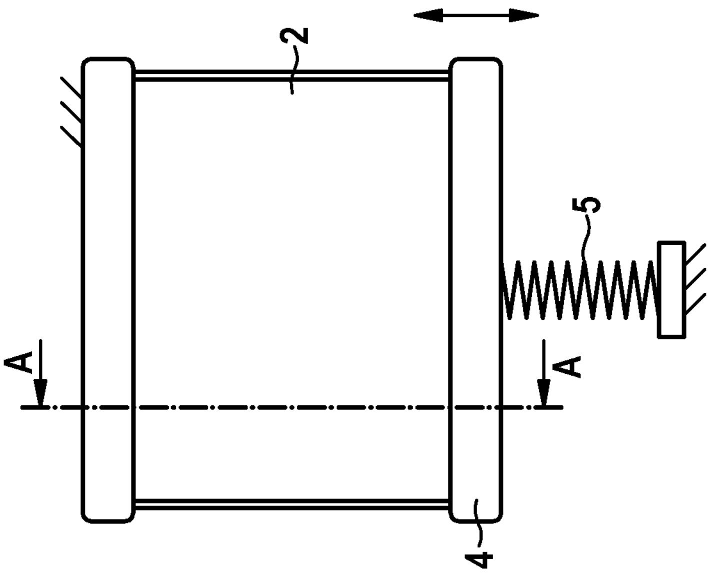
FIGS. 8*a*-8*b* show a cross-sectional view and a side view of a transducer device having a flat electrode-covered membrane preloaded by a spring.
Figure 8A:
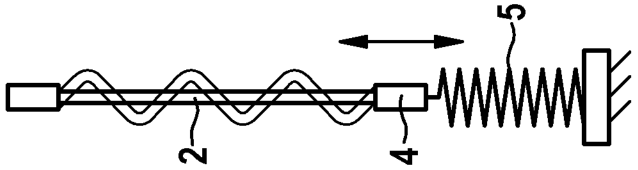

In a further configuration, which is shown in FIGS. 8*a* (side view) and 8*b* (side view), the transducer device may have the actuation element 4 coupled with a single membrane 2. The single membrane 2 is arranged between a straight or curved support and the correspondingly straight or curved actuation element 4. In other embodiments the single membrane 2 can be spirally arranged between the support and the actuation element 4.

For instance, the transducer device 1 may be used for music generation through the acoustic output where the tempo of the music is output through the tactile feedback acting on a body part. When the transducer device is in contact with the body part of the user, the user may be listening to the music while experiencing a tactile tempo beat which may allow to more easily play its own track in accordance with the music.

The invention claimed is:

1. Transducer device comprising:

At least one dielectric electro-active membrane, wherein the electro-active membrane comprises a dielectric electro-active elastomer sandwiched between electrode layers an actuation element which is supported on opposite ends and mechanically coupled with the at least one electro-active membrane so that the electro-active membrane is biased in at least one of its plane directions, wherein the electro-active membrane is biased by means of a weight of the actuation element and/or an biasing member;

wherein the actuation element is provided with a mass so that when electrically excited a first resonance frequency is developed in a fundamental mode of a longitudinal oscillation of the electro-active membrane which effects a movement oscillation of the actuation element and a second resonance frequency is developed in a fundamental mode of a transverse oscillation of the membrane, wherein the second resonance frequency is at least six times higher than the first resonance frequency, wherein the electroactive membrane is supported on opposite ends and mechanically coupled with an actuating element allowing the electroactive membrane to apply forces onto the actuating element and to oscillate in structural vibrations for acoustic output, wherein the actuating element is supported to move freely in at least one direction effected by the longitudinal deformation of the electroactive membrane thereby allowing the electroactive membrane to concurrently obtain a linear actuation or longitudinal deformation/force through the actuating element and a sound generation by means of structural oscillations of the electroactive membrane, a control unit, which is configured to selectively apply a multi-harmonic waveform actuation voltage with one or more frequencies onto the electro-active membrane to cause the longitudinal oscillation of the actuation element and/or the transverse oscillation of the membrane depending on the applied frequencies.

2. Transducer device according to claim 1 wherein the mass of the actuation element is at least 8 times higher than the mass of the electro-active membrane.

3. Transducer device according to claim 1, wherein the electro-active membrane is biased by means of a further electro-active membrane.

4. Transducer device according to claim 1, wherein the at least one dielectric electro-active membrane has a rectangular, circular or elliptic shape.

5. Transducer device according to claim 1, wherein the actuation element is arranged at one end or in a center region of the at least one dielectric electro-active membrane.

6. Transducer device according to claim 1, wherein the electro-active membrane is partitioned to selectively detect deformation and to selectively apply electrical excitation.

7. Transducer device according to claim 1, wherein the actuation element is coupled with multiple electro-active membranes.

8. Transducer device according to claim 1, wherein the actuation element is coupled with a single electro-active membrane.

9. Transducer device according to claim 1, wherein the control unit is further configured to detect an actuation on the actuating element by means of a measurement of a change of electrical capacitance and to selectively apply a multi-harmonic waveform actuation voltage with one or more predefined frequencies or one or more frequency sequences or respective predefined amplitudes onto the electro-active membrane depending on the measure of the detected change of the capacitance to cause vibrotactile feedback with the one or more predefined frequencies or the one or more frequency sequences and the respective predefined amplitudes or acoustic feedback with the one or more predefined frequencies and the respective predefined amplitudes.

* * * * *